US006691381B2

(12) United States Patent
Scollard et al.

(10) Patent No.: US 6,691,381 B2
(45) Date of Patent: Feb. 17, 2004

(54) FUEL RAIL MOUNTING CLIP

(75) Inventors: Joseph E. Scollard, Suffolk, VA (US); Stephen C. Bugos, Newport News, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/906,128

(22) Filed: Jul. 17, 2001

(65) Prior Publication Data

US 2003/0015177 A1 Jan. 23, 2003

(51) Int. Cl.[7] .......... F16M 13/00

(52) U.S. Cl. .......... 24/459; 24/462; 248/316.7; 248/74.2; 123/469

(58) Field of Search .......... 24/459, 462, 293–295; 248/74.2, 316.7, 316.1, 316.6, 229.2, 229.26; 123/469, 470, 471

(56) References Cited

U.S. PATENT DOCUMENTS 3,163,391 A * 12/1964 Adams .......... 24/339
3,216,685 A * 11/1965 Raymond .......... 248/316.7
4,805,479 A * 2/1989 Brightwell .......... 248/74.2
4,840,334 A * 6/1989 Kikuchi .......... 24/453
5,121,894 A * 6/1992 Twork et al. .......... 248/316.7
5,669,590 A * 9/1997 Przewodek .......... 248/68.1
5,762,299 A * 6/1998 Motsch .......... 248/65
5,921,520 A * 7/1999 Wisniewski .......... 248/300
6,062,516 A * 5/2000 Rizzo et al. .......... 248/316.7
6,105,216 A * 8/2000 Opperthauser .......... 24/279
6,257,530 B1 * 7/2001 Tsai .......... 248/73
6,334,242 B1 * 1/2002 Scollard et al. .......... 24/459
6,390,721 B1 * 5/2002 Wilson et al. .......... 403/234

* cited by examiner

*Primary Examiner*—Anthony Knight
*Assistant Examiner*—André L. Jackson

(57) ABSTRACT

A a clip for mounting an elongated fuel rail with respect to an internal combustion engine. The fuel rail extends along a longitudinal axis and includes a mounting portion at an intermediate positon along the longitudinal axis, and the internal combustion engine includes a recess. The clip comprises a first portion adapted to engage the fuel rail, and a second portion adapted to be slidably received in the recess along a generally transverse axis with respect to the longitudinal axis. The first portion partially surrounds the longitudinal axis and is adapted to engage the mounting portion so as to prevent relative displacement along the longitudinal axis. The second portion is adapted to be releasably retained with respect to the recess.

20 Claims, 4 Drawing Sheets

FUEL RAIL MOUNTING CLIP

FIELD OF THE INVENTION

The invention relates to a mounting clip, and more particularly, to mounting clips that secure a fuel rail with respect to an intake manifold of an internal combustion engine.

BACKGROUND OF THE INVENTION

A fuel rail assembly can supply fuel to an internal combustion engine. Some fuel rail assemblies may include a fuel rail tube and fuel injectors that are each retained within fuel cups disposed on the fuel rail tube. It is believed that a known arrangement of a fuel rail assembly is mounted with respect to an engine by fuel rail mounting brackets and mounting bolts. It is believed that the fuel rail mounting brackets are secured to the fuel rail tube by a known manufacturing process such as brazing. It is believed that this mounting and brazing process is relatively time-consuming and expensive on a production line.

Thus, it is believed that there is a need to provide a mounting clip for securing a fuel rail with respect to an intake manifold in a single step, i.e., without the need for brazing and mounting bolts or other types of mechanical fasteners.

SUMMARY OF THE INVENTION

The present invention provides a clip for mounting an elongated fuel rail with respect to an internal combustion engine. The fuel rail extends along a longitudinal axis and includes a mounting portion at an intermediate positon along the longitudinal axis, and the internal combustion engine includes a recess. In a preferred embodiment, the mounting portion is an enlarged section. The clip comprises a first portion adapted to engage the fuel rail, and a second portion adapted to be slidably received in the recess along a generally transverse axis with respect to the longitudinal axis. The first portion partially surrounds the longitudinal axis and is adapted to engage the enlarged section so as to prevent relative displacement along the longitudinal axis. The second portion is adapted to be releasably retained with respect to the recess.

In a preferred embodiment, a clip is provided for mounting an elongated fuel rail with respect to an internal combustion engine. The fuel rail extends along a longitudinal axis and includes an enlarged section at an intermediate positon along the longitudinal axis, and the internal combustion engine includes a recess. The clip comprises a first portion that is adapted to engage the fuel rail, and a second portion that is adapted to be received in the recess. The first portion partially surrounds the longitudinal axis and is adapted to extend along the longitudinal axis to either side of the enlarged section. The first portion includes a first section defining a first clip end; a second section extending from the first section and adapted to contiguously engage the fuel rail at a first angular location around the longitudinal axis; a third section extending from the second section and adapted to project away from the fuel rail; a fourth section extending from the third section and adapted to be spaced from the enlarged section relative to the longitudinal axis; a fifth section extending from the fourth section and adapted to project toward the fuel rail; a sixth section extending from the fifth section and adapted to contiguously engage the fuel rail at a second angular location around the longitudinal axis; and a seventh section extending from the sixth section and adapted to project away from the fuel rail. The second portion extends from the seventh section.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of the invention in accordance with a best mode contemplated for carrying out the invention. Like reference numerals are used to indicate like elements throughout the drawings.

DETAILED DESCRIPTION OF THE EMBODIMENTS

Figure 1:
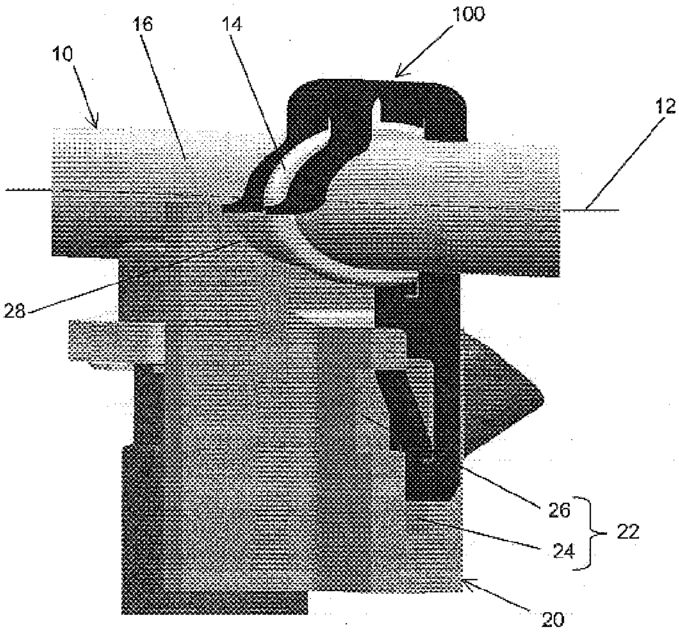
FIG. 1 is a perspective view of a first embodiment for mounting an elongated fuel rail with respect to an internal combustion engine.

Referring to FIG. 1, a clip 100 according to a first embodiment mounts a fuel rail 10 with respect to a portion 20 of an internal combustion engine. The fuel rail 10 extends along a longitudinal axis 12 and includes a mounting portion 14, e.g., an enlarged section, at an intermediate position along the longitudinal axis 12. Preferably, the enlarged section 14 is a continuous bead around an outer surface 16 of the fuel rail 10, although those skilled in the art will recognize that the enlarged section 14 can be other configurations as well. The portion 20, which may be a portion of an intake manifold for the internal combustion engine, includes a recess 22 providing a means to for the mounting clip 100 to engage the internal combustion engine. The recess 22 is shown as including a slot 24 and a locking aperture 26. Those skilled in the art will recognize that a feature of the engine other than the air intake manifold can provide the portion 20, and that the recess 22 may be alternatively configured.

Figure 2:
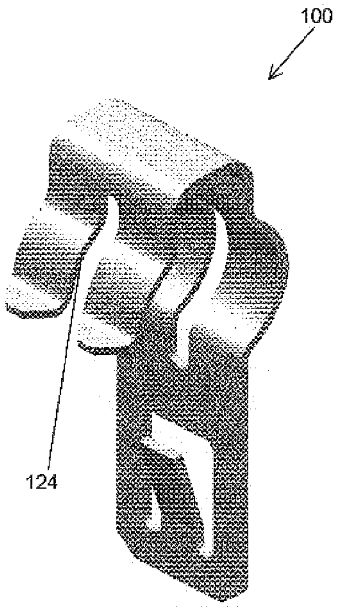
FIG. 2 is a perspective view of a clip according to the first embodiment.
Figure 3:
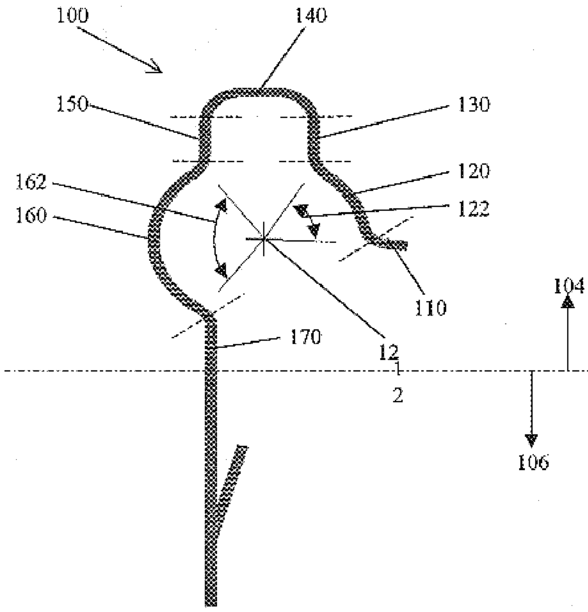
FIG. 3 is a side view of the clip according to the first embodiment.
Figure 4:
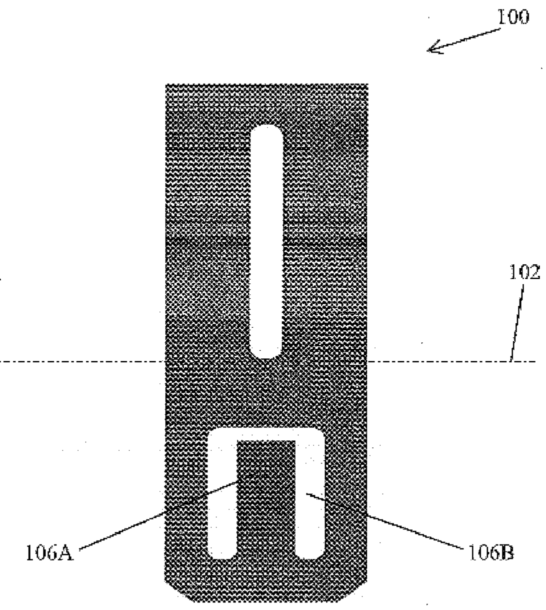
FIG. 4 is a front view of the clip according to the first embodiment.

Referring additionally to FIGS. 2–4, the mounting clip 100 is preferably formed from a single unitary sheet of metal. Although those skilled in the art will recognize that the mounting clip 100 can be formed from multiple separate pieces connected together to form a single piece and/or can be constructed from a material other than metal.

The clip 100 can be apportioned along a line 102 into a first portion 104 adapted to engage the fuel rail 10, and a second portion 106 adapted to be slidably received in the recess 22 along a generally transverse axis with respect to the longitudinal axis 12. The first portion 104 partially surrounds the longitudinal axis 12 and is adapted to engage the enlarged section 14 so as to prevent relative displacement along the longitudinal axis 14. The second portion 106 is adapted to be releasably retained with respect to the recess 22.

The first portion 104 of the mounting clip 100 comprises a plurality of sections that are separated by broken lines in FIG. 3. A first section 110 defines a first clip end 112. A second section 120 extends from the first section 110 and is shaped to contiguously engage the fuel rail 10 within a first angular range 122 around the longitudinal axis 12. A third section 130 extends from the second section 120 and projects obliquely away from the fuel rail 10. A fourth section 140 extends from the third section 130 and is spaced from the enlarged section 14 relative to the longitudinal axis 12. A fifth section 150 extends from the fourth section 140 and projects obliquely toward the fuel rail 10. A sixth section 160 extends from the fifth section 150 and shaped to contiguously engage the fuel rail 10 within a second angular range 162 around the longitudinal axis 12. A seventh section 170 extends from the sixth section 160 and projects obliquely away from the fuel rail 10.

The first section 110, the second section 120, the third section 130, the fifth section 150, the sixth section 160, and the seventh section 170 are each bifurcated so as to have parallel branches lying on opposite sides of the enlarged section 14. In the preferred embodiment of the first portion, there is a void between the branches, and the branches define at least one surface 124 that engage the enlarged section 14. It is also possible to prevent the fuel rail 10 from being displaced along the axis 12 without having a void between the branches so long as there is a surface defined that engages the enlarged section 14. In the preferred embodiment, the fourth section 140 longitudinally links the respective parallel branches of the third section 130 and the fifth section 150. The second portion 106 longitudinally links the parallel branches of the seventh section 170.

The fifth section 150 and the seventh section 170 generally extend in a common plane. The third section 130 extends parallel to this common plane and the fourth section 140 partially extends orthogonally to this common plane. The first angular range 122 and the second angular range 162 are on generally opposite sides of the longitudinal axis 12.

According to the first embodiment, the second portion 106 extends the projection of the seventh section 170 and comprises a central section 106A defined by a U-shaped cutout 106B. As best seen in FIGS. 1 and 2, the central section 106A projects obliquely with respect to the U-shaped cutout 106B and is releasably retained with respect to the locking aperture 26 of the recess 22.

Figure 5:
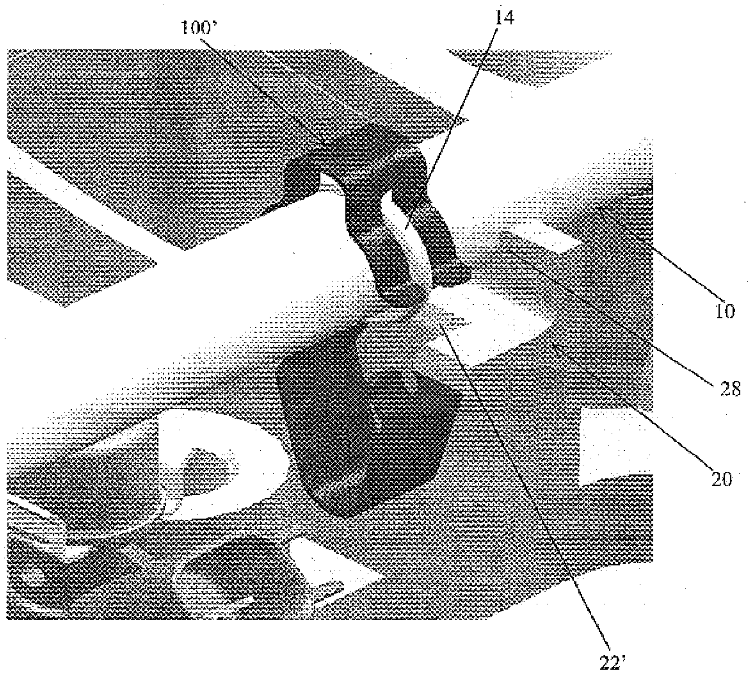
FIG. 5 is a perspective view of a second embodiment for mounting an elongated fuel rail with respect to an internal combustion engine.
Figure 6:
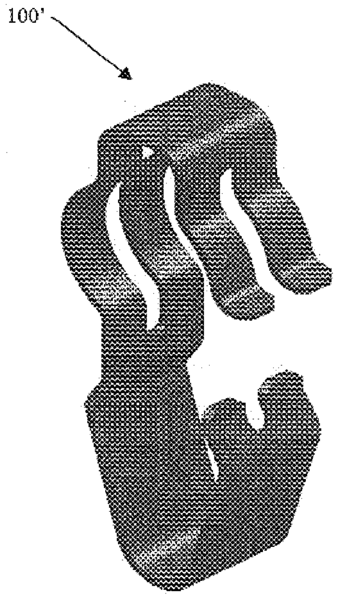
FIG. 6 is a perspective view of a clip according to the second embodiment.
Figure 7:
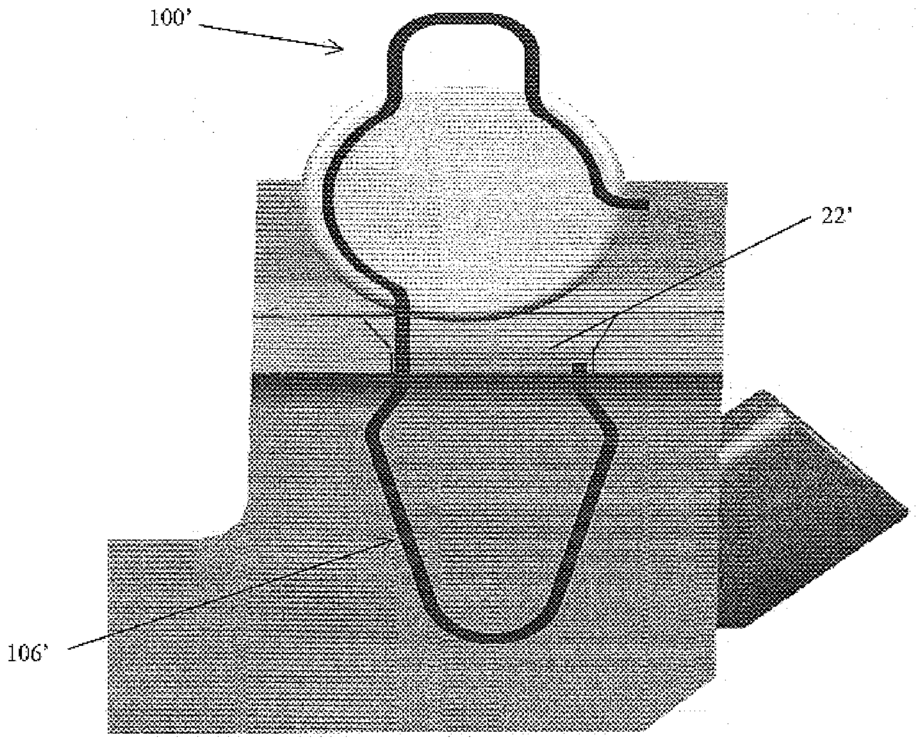
FIG. 7 is a side view of the clip according to the second embodiment.

According to the second embodiment illustrated in FIGS. 5–7, the first portion 104 is substantially the same as has been described above with respect to the first embodiment. However, the second portion 106' according to the second embodiment differs from the second portion 106 in that the second portion 106' comprises a configuration that resiliently expands against and engages opposite sides of a recess 22'.

According to either embodiment, after fuel rail clip 100, 100' is assembled to the fuel rail 10, this assembly is connected to the portion 20 of the intake manifold. This is accomplished by aligning the fuel rail 10 with a fuel rail saddle 28 and aligning the second portion 106,106' with the recess 22,22'. As the fuel rail 10 is pressed into the fuel rail saddle 28, the second portion 106,106' engages the recess 22,22'. According to the first embodiment, the central section 106A resiliently protrudes from the locking aperture 26, thereby resisting separation of the fuel rail 10 from the saddle 28 until the central section 106A is deformed so as to disengage the locking aperture 26. According to the second embodiment, the second portion 106' is initially compressed by the recess 22' and subsequently resiliently expands to engage opposite sides of the recess 22'. Like the first embodiment, the second embodiment also resists separation of the fuel rail 10 from the saddle 28 until the second portion 106' is recompressed.

Displacement of the fuel rail 10 along the axis 12 is resisted by the cooperative engagement of the enlarged section 14 with the bifurcated branches of the first portion 104.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

What is claimed is:

1. A clip for mounting an elongated fuel rail with respect to an internal combustion engine, the fuel rail extending along a longitudinal axis and including an enlarged section at an intermediate position along the longitudinal axis, and the internal combustion engine including a recess, the clip comprising:

- a first portion adapted to engage the fuel rail, the first portion partially surrounding the longitudinal axis and adapted to extend along the longitudinal axis to either side of the enlarged section, the first portion including:
  - a first section defining a first clip end;
  - a second section extending from the first section and adapted to contiguously engage the fuel rail at a first angular location around the longitudinal axis;
  - a third section extending from the second section and adapted to project away from the fuel rail;
  - a fourth section extending from the third section and adapted to be spaced from the enlarged section relative to the longitudinal axis;
  - a fifth section extending from the fourth section and adapted to project toward the fuel rail;
  - a sixth section extending from the fifth section and adapted to contiguously engage the fuel rail at a second angular location around the longitudinal axis; and
  - a seventh section extending from the sixth section and adapted to project away from the fuel rail; and
- a second portion adapted to be received in the recess of the internal combustion engine, the second portion having a projection extending from the seventh section into the recess.

2. The clip according to claim 1, wherein the first, second, third, fifth, sixth, and seventh sections are each bifurcated so as to be adapted to lie on opposite sides of the enlarged section.

3. The clip according to claim 2, wherein the fourth section longitudinally connects the bifurcations of the third and fifth sections.

4. The clip according to claim 1, wherein the first section is adapted to project away from the fuel rail.

5. The clip according to claim 1, wherein the first portion comprises a resilient material adapted to releasably retain the fuel rail.

6. The clip according to claim 1, wherein fifth and seventh sections generally extend in a common plane.

7. The clip according to claim 6, wherein the third section extends parallel to the common plane.

8. The clip according to claim 6, wherein the fourth section partially extends orthogonally to the common plane.

9. The clip according to claim 1, wherein the first and second angular locations are on generally opposite sides of the longitudinal axis.

10. The clip according to claim 1, wherein the second portion is adapted to be slidingly received in the recess.

11. The clip according to claim 1, wherein the projection comprises two projections projecting away from each other so that the projections engage the recess.

12. A clip for mounting an elongated fuel rail with respect to an internal combustion engine, the fuel rail extending along a longitudinal axis and including an enlarged section at an intermediate position along the longitudinal axis, and the internal combustion engine including a recess, the clip comprising:

a first portion adapted to engage the fuel rail, the first portion partially surrounding the longitudinal axis and adapted to extend along the longitudinal axis to either side of the enlarged section, the first portion including:

a first section defining a first clip end;

a second section extending from the first section and adapted to contiguously engage the fuel rail at a first angular location around the longitudinal axis;

a third section extending from the second section and adapted to project away from the fuel rail;

a fourth section extending from the third section and adapted to be spaced from the enlarged section relative to the longitudinal axis;

a fifth section extending from the fourth section and adapted to project toward the fuel rail;

a sixth section extending from the fifth section and adapted to contiguously engage the fuel rail at a second angular location around the longitudinal axis; and a seventh section extending from the sixth section and adapted to project away from the fuel rail; and a second portion adapted to be received in the recess, the second portion extending from the seventh section, wherein the second portion comprises a central section defined by a U-shaped cutout.

13. The clip according to claim 12, wherein the central section projects obliquely with respect to the U-shaped cutout.

14. The clip according to claim 12, wherein the central section is adapted to releasably retain the second portion with respect to the recess.

15. A clip for mounting an elongated fuel rail with respect to an internal combustion engine, the fuel rail extending along a longitudinal axis and including an enlarged section at an intermediate position along the longitudinal axis, and the internal combustion engine including a recess, the clip comprising:

a first portion adapted to engage the fuel rail, the first portion partially surrounding the longitudinal axis and adapted to extend along the longitudinal axis to either side of the enlarged section, the first portion including:

a first section defining a first clip end;

a second section extending from the first section and adapted to contiguously engage the fuel rail at a first angular location around the longitudinal axis;

a third section extending from the second section and adapted to project away from the fuel rail;

a fourth section extending from the third section and adapted to be spaced from the enlarged section relative to the longitudinal axis;

a fifth section extending from the fourth section and adapted to project toward the fuel rail;

a sixth section extending from the fifth section and adapted to contiguously engage the fuel rail at a second angular location around the longitudinal axis; and a seventh section extending from the sixth section and adapted to project away from the fuel rail; and a second portion adapted to be received in the recess, the second portion extending from the seventh section, the first, second, third, fifth, sixth, and seventh sections are each bifurcated so as to be adapted to lie on opposite sides of the enlarged section the fourth section longitudinally connects the bifurcations of the third and fifth sections, and wherein the second portion longitudinally connects the bifurcations of the seventh section.

16. A clip for mounting an elongated fuel rail with respect to an internal combustion engine, the fuel rail extending along a longitudinal axis and including a mounting at an intermediate position along the longitudinal axis, and the internal combustion engine including a recess, the clip comprising:

a first portion adapted to engage the fuel rail, the first portion partially surrounding the longitudinal axis and having a surface being adapted to engage the mounting portion so as to prevent relative displacement of the fuel rail along the longitudinal axis; and a second portion adapted to be slidably received in the recess of the internal combustion engine along a generally transverse axis with respect to the longitudinal axis, the second portion having a projection being adapted to be releasably retained with respect to the recess.

17. The clip according to claim 16, wherein the mounting portion defines an enlarged portion, the first portion comprises at least one bifurcated section and comprises at least one connecting section extending longitudinally with respect to the longitudinal axis, the at least one bifurcated section includes first and second branches adapted to lie on opposite sides of the enlarged section, and the at least one connecting section links the first and second branches of the bifurcated sections.

18. The clip according to claim 17, wherein the first portion comprises a plurality of bifurcated sections and one connecting section.

19. The clip according to claim 16, wherein the first portion comprises a resilient material adapted to releasably retain the fuel rail.

20. The clip according to claim 16, wherein the projection comprises two projections projecting away from each other so that the projections engage the recess.

* * * * *